(12) United States Patent
Oliveira et al.

(10) Patent No.: US 11,856,140 B2
(45) Date of Patent: Dec. 26, 2023

(54) PREDICTIVE COMMUNICATIONS SYSTEM

(71) Applicant: TalkDesk Inc, San Francisco, CA (US)

(72) Inventors: Nuno Oliveira, Lobao (PT); Carolina Bellani, Lisbon (PT); Gabriela Soares, Almada (PT); Mafalda Sá Velho, Odivelas (PT); Ricardo Sousa, Amadora (PT)

(73) Assignee: Talkdesk, Inc., San Francisco, CA (US)

( * ) Notice: Subject to any disclaimer, the term of this patent is extended or adjusted under 35 U.S.C. 154(b) by 47 days.

(21) Appl. No.: 17/687,744

(22) Filed: Mar. 7, 2022

(65) Prior Publication Data

US 2023/0283716 A1    Sep. 7, 2023

(51) Int. Cl.
*H04M 3/00*     (2006.01)
*H04M 3/51*     (2006.01)

(52) U.S. Cl.
CPC ................... *H04M 3/5158* (2013.01)

(58) Field of Classification Search
CPC .................................................. H04M 3/5158
USPC ....... 379/266.01–266.1, 265.01–265.14, 309
See application file for complete search history.

(56) References Cited

U.S. PATENT DOCUMENTS

| 5,343,518 A * | 8/1994 | Kneipp | H04M 3/5158 370/522 |
| 5,570,419 A * | 10/1996 | Cave | H04M 3/5158 379/112.01 |
| 5,862,203 A | 1/1999 | Wulkan et al. | |
| 5,897,616 A | 4/1999 | Kanevsky et al. | |
| 5,966,691 A | 10/1999 | Kibre et al. | |
| 5,970,124 A | 10/1999 | Csaszar et al. | |
| 6,100,891 A | 8/2000 | Thorne | |
| 6,128,415 A | 10/2000 | Hultgren et al. | |
| 6,163,607 A | 12/2000 | Bogart et al. | |
| 6,230,197 B1 | 5/2001 | Beck et al. | |
| 6,263,057 B1 | 7/2001 | Silverman | |

(Continued)

FOREIGN PATENT DOCUMENTS

| EP | 1 418 519 A1 | 5/2004 |
| JP | 5986065 B2 | 9/2016 |

(Continued)

OTHER PUBLICATIONS

Gaietto, Molly., "What is Customer DNA?",—NGDATA Product News, Oct. 27, 2015, 10 pages.

(Continued)

*Primary Examiner* — William J Deane, Jr.
(74) *Attorney, Agent, or Firm* — Rimon PC; Marc S. Kaufman

(57) ABSTRACT

A computer implemented method and computer system for generating outbound calls in a call center in which a plurality of agents are to communicate respectively with outside parties through the outbound calls. The method includes determining a number of agents available for outbound calls, determining phone numbers respectively corresponding to the outside parties, creating an ordered list of calls corresponding to the phone numbers and periodically generating new call attempts by automatically dialing the phone numbers at a dynamic rate, wherein a number of new call attempts is based on a predictive algorithm.

22 Claims, 6 Drawing Sheets

(56) References Cited

U.S. PATENT DOCUMENTS

| | | |
|---|---|---|
| 6,263,065 B1 * | 7/2001 | Durinovic-Johri ............................ H04M 3/5237 379/266.03 |
| 6,345,093 B1 | 2/2002 | Lee et al. |
| 6,373,938 B1 * | 4/2002 | Palacios .............. H04M 3/5158 379/900 |
| 6,385,584 B1 | 5/2002 | McAllister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 | 3/2008 | Buonanno et al. |
| 7,372,952 B1 | 5/2008 | Wu et al. |
| 7,382,773 B2 | 6/2008 | Schoeneberger et al. |
| 7,409,336 B2 | 8/2008 | Pak et al. |
| 7,426,268 B2 | 9/2008 | Walker et al. |
| 7,466,334 B1 | 12/2008 | Baba |
| 7,537,154 B2 | 5/2009 | Ramachandran |
| 7,634,422 B1 | 12/2009 | Andre et al. |
| 7,657,263 B1 | 2/2010 | Chahrouri |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,369 B1 | 6/2011 | Briere et al. |
| 8,060,394 B2 | 11/2011 | Woodings et al. |
| 8,073,129 B1 | 12/2011 | Kalavar |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B1 | 7/2012 | Backhaus et al. |
| 8,243,896 B1 | 8/2012 | Rae |
| 8,300,798 B1 | 10/2012 | Wu et al. |
| 8,369,338 B1 | 2/2013 | Peng et al. |
| 8,370,155 B2 | 2/2013 | Byrd et al. |
| 8,391,466 B1 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,535,059 B1 | 9/2013 | Noble, Jr. et al. |
| 8,583,466 B2 | 11/2013 | Margulies et al. |
| 8,594,306 B2 | 11/2013 | Laredo et al. |
| 8,626,137 B1 | 1/2014 | Devitt et al. |
| 8,635,226 B2 | 1/2014 | Chang et al. |
| 8,644,489 B1 | 2/2014 | Noble et al. |
| 8,671,020 B1 | 3/2014 | Morrison et al. |
| 8,688,557 B2 | 4/2014 | Rose et al. |
| 8,738,739 B2 | 5/2014 | Makar et al. |
| 8,767,948 B1 | 7/2014 | Riahi et al. |
| 8,811,597 B1 | 8/2014 | Hackbarth et al. |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 8,995,648 B1 * | 3/2015 | Gibbs ................ G06Q 30/0201 379/133 |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 | 7/2015 | Etter et al. |
| 9,100,483 B1 | 8/2015 | Snedden |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hedge et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,813,559 B1 * | 11/2017 | Noble, Jr. ........... H04M 3/5238 |
| 9,823,949 B2 | 11/2017 | Ristock et al. |
| 9,883,037 B1 | 1/2018 | Lewis et al. |
| 9,894,478 B1 | 2/2018 | Deluca et al. |
| 9,930,181 B1 | 3/2018 | Moran et al. |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Cordon et al. |
| 10,554,817 B1 | 2/2020 | Sullivan et al. |
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |
| 10,735,586 B1 | 8/2020 | Johnston |
| 10,742,806 B2 | 8/2020 | Kotak |

(56) References Cited

U.S. PATENT DOCUMENTS

| | | |
|---|---|---|
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,943,589 B2 | 3/2021 | Naughton et al. |
| 10,970,682 B1 | 4/2021 | Aykin |
| 11,017,176 B2 | 5/2021 | Ayers et al. |
| 11,089,158 B1 | 8/2021 | Holland et al. |
| 11,425,252 B1* | 8/2022 | Martin ............... H04M 3/5141 |
| 2001/0008999 A1 | 7/2001 | Bull |
| 2001/0024497 A1 | 9/2001 | Campbell |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1 | 7/2004 | Schoeneberger et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2004/0215451 A1 | 10/2004 | Macleod |
| 2005/0033957 A1 | 2/2005 | Enokida |
| 2005/0043986 A1 | 2/2005 | McConnell et al. |
| 2005/0063365 A1 | 3/2005 | Mathew et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0188086 A1 | 8/2006 | Busey et al. |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0011153 A1* | 1/2007 | Pillai ................... G06Q 30/00 |
| | | 707/999.005 |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121894 A1* | 5/2007 | Noble ................. H04M 3/5158 |
| | | 379/265.02 |
| 2007/0121902 A1 | 5/2007 | Stoica et al. |
| 2007/0121903 A1 | 5/2007 | Moore, Jr. et al. |
| 2007/0133760 A1* | 6/2007 | Cotignola ......... H04M 3/42093 |
| | | 379/88.13 |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1 | 12/2008 | Hamilton et al. |
| 2009/0018996 A1 | 1/2009 | Hunt et al. |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114646 A1 | 5/2010 | Mcilwain et al. |
| 2010/0189249 A1* | 7/2010 | Shah ..................... H04L 12/66 |
| | | 379/265.09 |
| 2010/0189250 A1 | 7/2010 | Williams et al. |
| 2010/0211515 A1 | 8/2010 | Woodings et al. |
| 2010/0235341 A1 | 9/2010 | Bennett |
| 2010/0250196 A1 | 9/2010 | Lawler et al. |
| 2010/0262549 A1 | 10/2010 | Kannan et al. |
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0082688 A1 | 4/2011 | Kim et al. |
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |

(56) References Cited

U.S. PATENT DOCUMENTS

| | | |
|---|---|---|
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0023235 A1 | 1/2013 | Fan et al. |
| 2013/0060587 A1* | 3/2013 | Bayrak ............... G06Q 10/10 705/7.11 |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1* | 8/2013 | Flockhart ............ H04M 3/5158 379/265.1 |
| 2013/0223610 A1 | 8/2013 | Kohler et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1 | 3/2014 | Zhakov et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 8/2016 | Thirugnanasundaram et al. |
| 2016/0295018 A1 | 10/2016 | Loftus et al. |
| 2016/0295020 A1* | 10/2016 | Shaffer ............... H04M 3/5235 |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0378569 A1 | 12/2016 | Ristock et al. |
| 2016/0381222 A1 | 12/2016 | Ristock et al. |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111509 A1 | 4/2017 | Mcgann et al. |
| 2017/0116173 A1 | 4/2017 | Lev-Tov et al. |
| 2017/0118336 A1 | 4/2017 | Tapuhi et al. |

(56) References Cited

U.S. PATENT DOCUMENTS

| | | |
|---|---|---|
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | Mccord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0097910 A1 | 4/2018 | D'Agostino et al. |
| 2018/0114234 A1 | 4/2018 | Fighel |
| 2018/0121766 A1 | 5/2018 | Mccord et al. |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0165062 A1 | 6/2018 | Yoo et al. |
| 2018/0165691 A1 | 6/2018 | Heater et al. |
| 2018/0165692 A1 | 6/2018 | Mccoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |
| 2020/0125919 A1 | 4/2020 | Liu et al. |
| 2020/0126126 A1 | 4/2020 | Briancon et al. |
| 2020/0134492 A1 | 4/2020 | Copeland |
| 2020/0134648 A1 | 4/2020 | Qi et al. |
| 2020/0137097 A1 | 4/2020 | Zimmermann et al. |
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0395008 A1 | 12/2020 | Cohen et al. |
| 2020/0410506 A1 | 12/2020 | Jones et al. |
| 2021/0004536 A1 | 1/2021 | Adibi et al. |
| 2021/0005206 A1 | 1/2021 | Adibi et al. |
| 2021/0042839 A1 | 2/2021 | Adamec |
| 2021/0056481 A1 | 2/2021 | Wicaksono et al. |
| 2021/0067627 A1 | 3/2021 | Delker et al. |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |

(56) References Cited

U.S. PATENT DOCUMENTS

| | | |
|---|---|---|
| 2021/0089762 A1 | 3/2021 | Rahimi et al. |
| 2021/0091996 A1 | 3/2021 | Mcconnell et al. |
| 2021/0105361 A1 | 4/2021 | Bergher et al. |
| 2021/0124843 A1 | 4/2021 | Vass et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136204 A1 | 5/2021 | Adibi et al. |
| 2021/0136205 A1 | 5/2021 | Adibi et al. |
| 2021/0136206 A1 | 5/2021 | Adibi et al. |
| 2021/0201244 A1 | 7/2021 | Sella et al. |
| 2022/0129905 A1 | 4/2022 | Sethumadhavan et al. |
| 2022/0398682 A1* | 12/2022 | Tam ................ G06Q 10/06398 |

FOREIGN PATENT DOCUMENTS

| | | |
|---|---|---|
| WO | 2006-037836 A1 | 4/2006 |
| WO | 2012/024316 A2 | 2/2012 |
| WO | 2015/099587 A1 | 7/2015 |
| WO | 2019142743 A1 | 7/2019 |

OTHER PUBLICATIONS

Fan et al., "Demystifying Big Data Analytics for Business Intelligence Through the Lens of Marketing Mix", Big Data Research, vol. 2, Issue 1, Mar. 1, 2015, 16 pages.

An et al.,, Towards Automatic Persona Generation Using Social Media Aug. 1, 2016, 2016 IEEE 4th International Conference on Future Internet of Things and Cloud Workshops (FiCloudW), 2 pages.

Bean-Mellinger, Barbara., "What is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/m/marketing.asp, Mar. 29, 2019, 5 pages.

dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., Jan. 1, 2017, 16 pages.

Zhang et al., "A Bayesian approach for modeling and analysis of call center arrivals", Jan. 1, 2013 Winter Simulations Conference (WSC), ieeexplore.ieee.org, pp. 713-723.

Mehrotra et al., "Call Center Simulation Modeling: Methods, Challenges, and Opportunities" Proceedings of the 2003 Winter Simulation Conference, vol. 1, Jan. 1, 2003, pp. 135-143.

Mandelbaum et al., "Staffing Many-Server Queues with Impatient Customers: Constraint Satisfaction in Call Center", Operations Research, Sep. - Oct., 2009, vol. 57, No. 5 (Sep. 1-Oct., 2009), pp. 1189-1205.

Fukunaga et al., "Staff Scheduling for Inbound Call Centers and Customer Contact Centers", AI Magazine, Winter, vol. 23, No. 4, Jan. 1, 2002, pp. 30-40.

Feldman et al., "Staffing of Time-Varying Queues to Achieve Time-Stable Performance", Management Science, Feb. 1, 2008, vol. 54, No. 2, Call Center Management, pp. 324-338.

Business Wire, "Rockwell SSD announces Call Center Simulator", Feb. 4, 1997, 4 pages.

Nathan, Stearns., "Using skills-based routing to the advantage of your contact center", Customer Inter@ction Solutions, Technology Marketing Corporation, May 1, 2001, vol. 19 No. 11, pp. 54-56.

Aldor-Noiman et al., "Workload forecasting for a call center: Methodology and a case study", The Annals of Applied Statistics, vol. 3, No. 4, 2009, pp. 1403-1447.

Koole et al., "An overview of routing and staffing algorithms in multi-skill customer contact centers", 2006, 43 pages.

Krishnan, Krish, "Data Warehousing in the Age of Big Data", Morgan Kaufmann, Chapter 5, 2013, 28 pages.

Aksin et al., "The Modern Call Center: A Multi-Disciplinary Perspective on Operations Management Research", Production and Operations Management, 2007, vol. 16, No. 6, pp. 665-688.

Buesing et al., "Getting the Best Customer Service from your IVR: Fresh eyes on an old problem," [online] Mckinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Chiu et al., "A multi-agent infrastructure for mobile workforce management in a service oriented enterprise", Proceedings of the 38th annual Hawaii international conference on system sciences, IEEE, 2005, pp. 10.

Diimitrios et al., "An overview of workflow management: From process modeling to workflow automation infrastructure," Distributed and parallel Databases, 1995, vol. 3, No. 2 pp. 119-153.

Ernst et al. "An Annotated Bibliography of Personnel Scheduling and Rostering", CSIRO Mathematical and Information Sciences, 2003, 155 pages.

Ernst et al., "Staff scheduling and rostering: A review of applications, methods and models," European Journal of Operational Research, 2004, vol. 153, pp. 3-27.

Federal Register, vol. 72, No. 195, Oct. 10, 2007, pp. 57526-57535.

Federal Register, vol. 75, No. 169, Sep. 1, 2010, pp. 53643-53660.

Federal register, vol. 79, No. 241 issued on Dec. 16, 2014, p. 74629, col. 2, Gottschalk v. Benson.

Federal Register, vol. 84, No. 4, Jan. 7, 2019, pp. 50-57.

Federal Register, vol. 84, No. 4, Jan. 7, 2019, p. 53-55.

Grefen et al., "A reference architecture for workflow management systems", Data & Knowledge Engineering, 1998, vol. 27, No. 1, pp. 31-57.

https://www.uspto.gov/patent/laws-and-regulations/examination-policy/examination- guidelines-training-materials-view-ksr, signed Aug. 20, 2010.

Huang et al., "Agent-based workflow management in collaborative product development on the Internet", Computer-Aided Design, 2000, vol. 32, No. 2, pp. 133-144.

Janarthanam, "Hands on Chatbots and conversational UI development: Build chatbots and voice user interfaces with Chatfuel, Dialogflow, Microsoft Bot Framework, Twilio, and Alexa Skills" Dec. 2017.

Myers et al., "At the Boundary of Workflow and AI", Proc. AAAI 1999 Workshop on Agent-Based Systems in The Business Context, 1999, 09 pages.

Niven, "Can music with prosocial lyrics heal the working world? A field intervention in a call center." Journal of Applied Social Psychology, 2015; 45(3), 132-138. doi:10.1111/jasp.12282 ).

On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).

U.S. Appl. No. 16/668,214, NFOA mailed Nov. 10, 2021.

U.S. Appl. No. 16/668,215, NFOA mailed Dec. 7, 2021.

Van Den Bergh et al. "Personnel scheduling: A literature review", European journal of operational research, 2013, vol. 226, No. 3 pp. 367-385.

United States Patent and Trademark Office, Non-Final Office Action for U.S. Appl. No. 16/550,961 dated Mar. 2, 2020.

United States Patent and Trademark Office, Final Office Action for U.S. Appl. No. 16/550,961 dated Jun. 17, 2020.

\* cited by examiner

PREDICTIVE COMMUNICATIONS SYSTEM

BACKGROUND

The disclosed technology relates to generating outbound communications from a call center. Call centers are computer systems that connect parties, such as potential customers, to persons or groups of persons, referred to as agents, that are able to assist the party. Customers, or other callers interact with a contact center using voice, email, text, and web interfaces to communicate with agent(s) through a computer network and one or more of text or multimedia channels. The agent(s) may be remote from the contact center and may handle communications with customers on behalf of an enterprise associated with the contact center.

The agent(s) may utilize computing devices, such as workstations, desktop computers, laptops, telephones, a mobile smartphone and/or a tablet. Similarly, customers may communicate using a plurality of devices, including a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network. The network types are provided by way of example and are not intended to limit types of networks used for communications.

In some implementations, agents may be assigned to one or more "queues", and the agents assigned to a queue may handle communications that are placed in the queue by the contact center. For example, there may be queues associated with a language (e.g., English or Chinese), topic (e.g., technical support or billing), or a particular country of origin of the communication. When a communication is received by the contact center, the communication may be placed in a relevant queue, and the communication can be routed to one or more of the agents assigned to the relevant queue to handle the communication.

Further, outbound call campaigns, where the call center proactively contacts outside parties and connects the parties with agents, is a well-known form of telemarketing and/or information gathering. For example, the agents may originate calls to the customers or potential customers and ask survey questions or describe products and services that are for sale. In more sophisticated instances, a list of outbound calls is created and calls on the list are made automatically initiated by the call center computer(s) and, when answered, are routed/connected to an agent in a manner that can be similar to routing of incoming communications. It is desirable to balance the quantity and rate of outgoing calls with the number of available agents in a dynamic manner to minimize both agent idle time and the need to abandon calls when an agent is not available to handle the call. The dynamics of a call center are very difficult to forecast because of the many dynamic, and seemingly random factors that are involved. For example, it is difficult, if not impossible to predict the time that any specific call will take (e.g., the call recipient may have many questions). Therefore, the availability of agents is very dynamic. Further, the same group of agents could be handling incoming calls to the call center contemporaneously with the outgoing calls and/or the agents may be assigned to multiple distinct outgoing call campaigns.

The concept of "predictive modeling", also known as "predictive analytics", applies mathematical processes to predict future events or outcomes by analyzing existing patterns that are likely to be indicative of future results.

Once historical data indicating previous activity has been collected, it can often be used to train statistical models known as "machine learning models" (ML). Predictive modeling has been used in connection with meteorology and weather forecasting, as well as in many business applications. For example, predictive modeling is often applied in online advertising and marketing to determine what kinds of products users might be interested in, and what they are likely to click on, based on previous activity on the Internet. Predictive modeling has also been used to detect email "spam" and to detect fraudulent activity, such as financial scams.

There are many known predictive analytics methodologies, including logistic regression, time series analysis, decision trees, and neural networks. A neural network is a machine learning model that processes large volumes of labeled data to detect correlations between variables in the data. The algorithm can then be used to make inferences about unlabeled data files that are similar in type to the training data set. Common algorithms for predictive modeling include: Random Forest; Gradient Boosted; K-Means; and Prophet Various predictive modeling tools, which allow customized predictive models to be created, are well known. These tools include:

Sisense
Oracle Crystal Ball
IBM SPSS Predictive Analytics Enterprise
SAS advanced Analytics Predictive modeling considerations In applying a predictive model, it is critical to define and acquire the correct data and define the workflow of the application in which the model is uses. Further, in outgoing call campaigns, as noted above, there are many unrelated variables, that render the application of learning models difficult and ineffective. For example, it is difficult to apply learning models to the various variables in a pragmatic manner, there is no standard source of quality training datasets For these reasons, predictive modeling has not been effectively applied to outgoing call campaigns.

SUMMARY

Applicants have identified specific parameters of influence, and workflows, in outbound call campaigns for which application of a learning model can be effective to improve the efficiency of call origination and routing in a call campaign computing system. A first disclosed implementation is a computer implemented method for generating outbound calls in a call center in which a plurality of agents are to communicate respectively with outside parties through the outbound calls, the method includes determining a number of agents available for outbound calls, determining phone numbers respectively corresponding to the outside parties, creating an ordered list of calls corresponding to the phone numbers, periodically generating new call attempts by automatically dialing the phone numbers at a dynamic rate, wherein a number of new call attempts is based on a predictive algorithm that includes;

(a) selecting a set of N number of calls that are next on the ordered list
(b) determinizing corresponding probabilities of pick up for each call in the set of calls;
(c) summing the corresponding probabilities of pick up to determine a pick up rate for the set of calls; and
(d) launching a number of calls in the set of calls that correspond to the number of available agents; and repeating (a), (b), (c) and (d) until a desired number of calls have been launched.

A second disclosed implementation is a computer system including processors which execute code to accomplish a method of generating outbound calls in a call center in which a plurality of agents are to communicate respectively with outside parties through the outbound calls, the method includes determining a number of agents available for outbound calls, determining phone numbers respectively corresponding to the outside parties, creating an ordered list of calls corresponding to the phone numbers, periodically generating new call attempts by automatically dialing the phone numbers at a dynamic rate, wherein a number of new call attempts is based on a predictive algorithm that includes;

(a) selecting a set of N number of calls that are next on the ordered list
(b) determinizing corresponding probabilities of pick up for each call in the set of calls;
(c) summing the corresponding probabilities of pick up to determine a pick up rate for the set of calls; and
(d) launching a number of calls in the set of calls that correspond to the number of available agents; and repeating (a), (b), (c) and (d) until a desired number of calls have been launched.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown.

DETAILED DESCRIPTION

Figure 1:
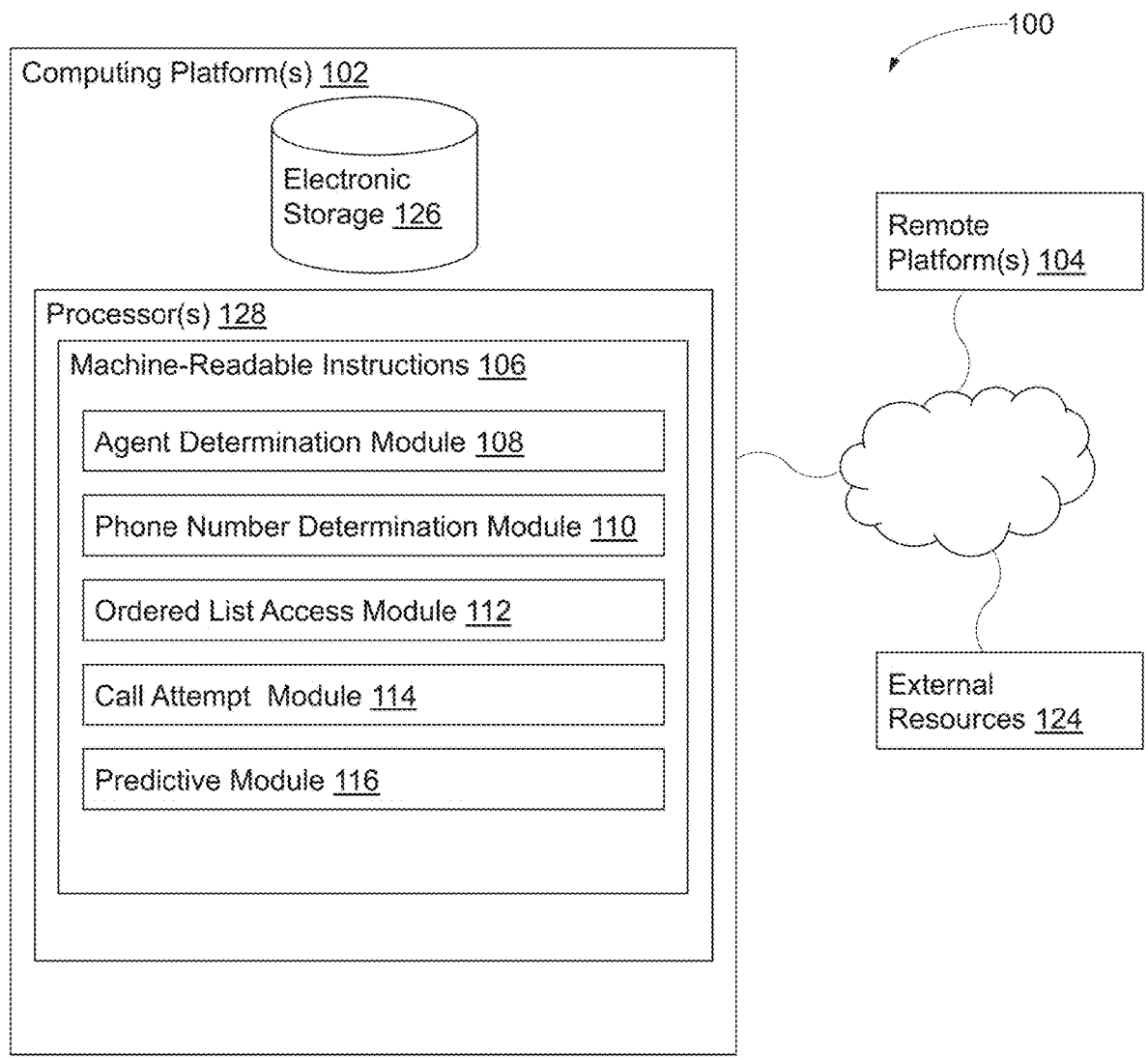
FIG. 1 is a schematic illustration of a computer system for pacing outbound calls in a campaign.

Certain terminology is used in the following description for convenience only and is not limiting. For example, unless specifically set forth herein, the terms "a," "an" and "the" are not limited to one element but instead should be read as meaning "at least one." The terminology includes the words noted above, derivatives thereof and words of similar import.

As noted above, in an outbound calling campaign, it is desirable to have an agent ready and waiting when a call is answered by a party. However, it is also desirable to maximize the number of outbound calls per agent, i.e., to minimize agent idle time. To balance these conflicting objectives, it is known to automatically pace outbound calls, in cycles of calls originated, based on the number of currently available agents and historical "picked up rate" that indicates the number of calls that will likely be picked up (i.e. answered by a live voice), as a percentage of calls made for example. However, as noted above, there are a myriad of unrelated dynamic factors in ascertaining the best pacing for an outbound call campaign. As a result, known outbound call campaigns often have a high number of idle agents, and/or answered calls that must be abandoned without connection to an agent.

As noted above, calls of outgoing call campaigns are accomplished in cycles in which a relatively small (with respect to the entire number of calls in the campaign) number of calls are made at one time based on the number of available agents to handle the calls and other parameters (referred to as "features" herein) of the call campaign. For example, it may be desirable that less than 50% of outgoing calls be abandoned by the call center (because there is not available agent when the call is answered, for example). The following formula can be applied to determine the number of calls that should be ringing currently:

number_new_attempts=max(number_attempts−number_pending_attempts, 0)

number_attempts=floor(min(ceiling(number_agents_available*1.0/pick_up_rate), number_agents_available*MAX_DIALING_RATIO, max(number_agents_available, floor((number_agents_available+allowed_aba))

Where:
pick_up_rate=total_answered_attempts/total_finished_attempts
allowed_abandonment=picked_up_attempts* ABANDONMENT_RATE−total_abandon
picked_up_attempts=all attempts where the record answered the call The following table describes examples of various variables/data structures that can be used in an algorithm to determine a number of new calls for a cycle.

| Reference | Description |
| --- | --- |
| number_pending_attempts | Number of attempts that are ringing and waiting either for the customer to pick up, orfor the agent to connect. |
| number_agents_available | Number of agents available for outboundcalls. |
| pick_up_rate | Current customer pick up rate for a given window. |
| total_answered_attempts | Attempts that were answered by a customer. |
| total_finished_attempts | Total number of attempts finished in a given window. |
| MAX_DIALING_RATIO | The maximum dialing ratio per agent. For predictive, it must be greater than 1 so thatwe can attempt more calls than agents available. |
| allowed_abandonment | The number of additional calls an automated Dialer can originate while respecting the desired abandonment rates/limits |
| total_finished_attempts | Total number of attempts finished in a given window. |
| ABANDONMENT_RATE | Constant that defines the abandonment rate for a given time window. |
| total_abandoned_attempts | The number of times a call center terminated a call before it was completed. This may happen where there wasn't an agent available when the contact answered the call. |

Disclosed implementations leverage Machine Learning models in new ways, and for new applications, to automatically learn from data and improve decision making for outbound call campaigns. For example, applicant has discovered that, by applying Machine Learning models to predict picked up rate, the efficiency of an outbound call campaign can be greatly improved with minimal computing resources. An outbound dialer system possesses large, classified datasets that can be used to train supervised predictive models. For instance, each call of a previous campaign has a corresponding system disposition and possibly a call disposition. Therefore, this data can be used to produce various predictive models to determine, for example, a probability of an individual call being picked-up, a probability of a busy call or a probability of a call being abandoned. Accordingly, these models can provide valuable information for various decisions that are critical to outbound call campaigns such as: calculation of the number of calls; selection and sorting of records; allocation of agents for pending calls; and cancellation of pending calls.

FIG. 1 illustrates an outgoing call campaign system 100 in accordance with disclosed implementations. As will be seen below, system 100 can be applied to originate outbound calls in a campaign in cycles and at a rate that improves efficiency of the campaign. System 100 may include one or more servers 102. Server(s) 102 may be configured to communicate with one or more remote computing platforms 104 according to a client/server architecture and/or other architectures. Users, such as those desiring to configure the features of a call campaign, may access system 100 via client computing platform(s) 104. System 100 can be integrated into a conventional call center architecture.

Server(s) 102 may be configured by machine-readable instructions 106. Machine-readable instructions 106 may include one or more instruction modules. The instruction modules may include computer program modules. The instruction modules may include one or more of agent determination module 108, phone number determination module 110, ordered list access module 112, call attempt module 114, predictive module 116 and/or other instruction modules. For example, modules can be provided for selection and sorting of records; allocation of agents for pending calls; and/or cancellation of pending calls, as described in detail below.

Agent determination module 108 can determine, or otherwise ascertain, a number of agents currently available for outbound calls. Phone number determination module 110 can determine, or otherwise ascertain, phone numbers respectively corresponding to the outside parties to be contacted in an outbound call campaign. Ordered list access module 112 can access an ordered list of calls corresponding to the phone numbers. Call attempt module 114 can periodically generate new call attempts, in cycles, by automatically dialing the phone numbers at a dynamic rate. Predictive module 116 can determine the dynamic rate based on a predictive algorithm that includes;

(a) selecting a set of N number of calls that are next on the ordered list
(b) determinizing corresponding probabilities of pick up for each call in the set of calls;
(c) summing the corresponding probabilities of pick up to determine a pick up rate for the set of calls;
(d) launching a number of calls in the set of calls that correspond to the number of available agents; and
repeating (a), (b), (c) and (d) until a desired number of calls have been launched.

In some implementations, server(s) 102, remote computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, remote computing platform(s) 104, and/or external resources 124 may be operatively linked via some other communication media.

External resources 124 may include sources of information outside of system 100, external entities participating with system 100, and/or other resources. In some implementations, some or all the functionality attributed herein to external resources 124 may be provided by resources included in system 100. For example, external resources can include a database of a call center system. As used herein, the term "module" may refer to any component or set of components that perform the functionality attributed to the module. This may include one or more physical processors during execution of processor readable instructions, the processor readable instructions, circuitry, hardware, storage media, or any other components.

Figure 2:
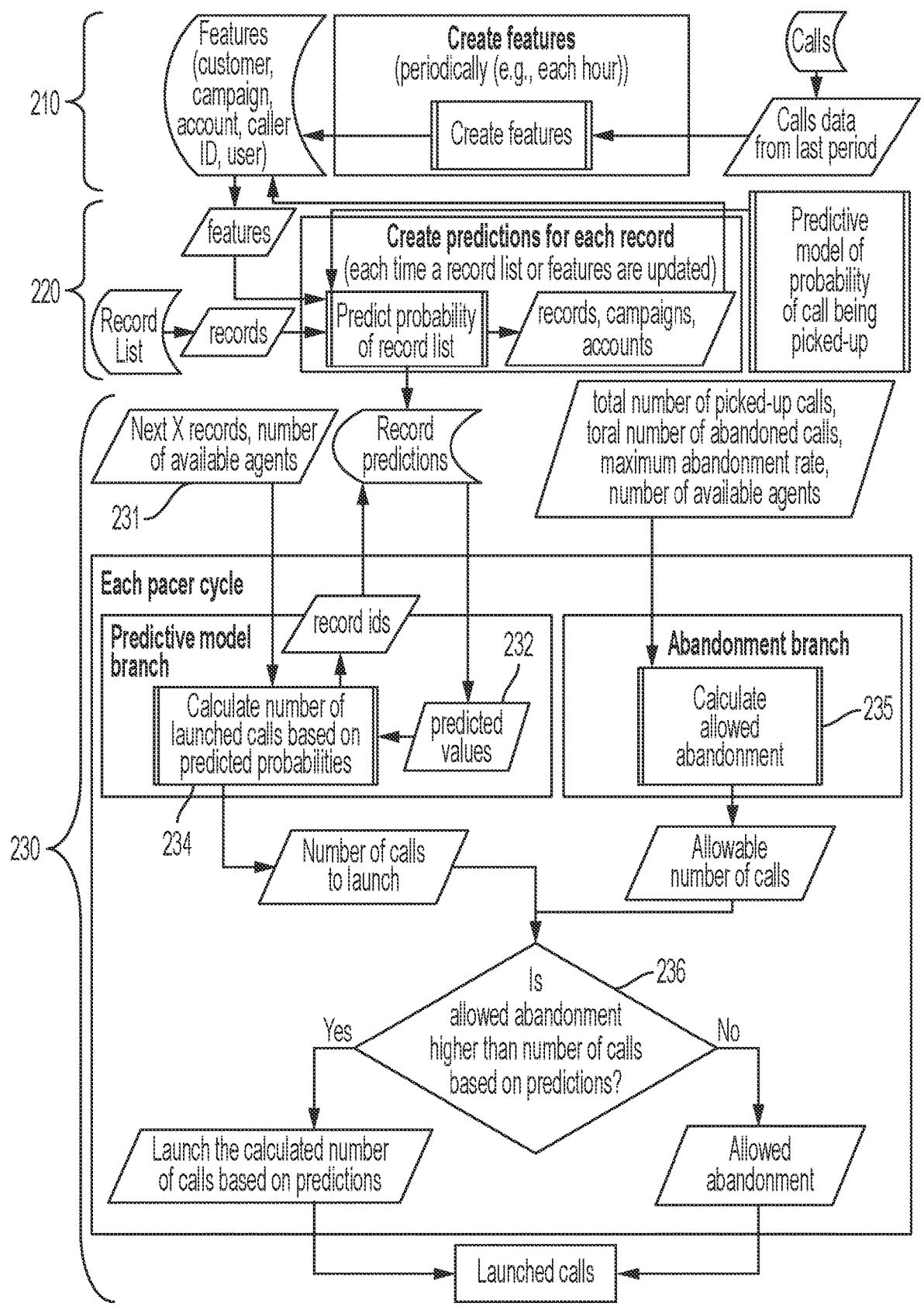
FIG. 2 is an architecture and flow diagram of the application of a predictive model for predicting call picked up rate.

FIG. 2 illustrates the application of a predictive model to improve the calculation of the number of calls in each cycle of an outbound call campaign. The use of a predictive model in this manner allows the number of potentially launched calls in a cycle to be calculated based on the predicted probability of each individual potential call, or a set of calls, being picked-up, not merely an overall percentage of calls that are expected to be picked up. The sum of the predicted probabilities of the potentially launched calls can be matched to the number of available agents to ascertain the number of calls to launch at any particular time. For example, the expected number of picked-up calls should be similar to the expected number of available agents to minimize agent idle time and minimize the number of abandoned calls. This allows the campaign algorithm to look at the calls in the campaign list and determine which specific calls to launch in a cycle based on the number of available agents. As a simple example, if the next four calls on a campaign list have respective probabilities of 10%, 20%, 50%, and 20%, and there is only one available agent, these four calls can be launched and one pickup will be expected (because the summed probability is 100% or 1 call).

The summing of call pickup probabilities can be periodically or continuously accomplished to select the specific calls, and the quantity thereof, to launch at any given time. In other words, the utilization of the predicted picked-up rate based on probabilities of pickup of each call allows improvement of both the average number of picked-up calls per cycle (related with agents' idle time) and the intended abandonment rate when compared with historical picked up rate and maximum dialing ratio. As shown in FIG. 2, a call campaign can be created at creation phase 210 in a conventional manner. Typically, the campaign will define the number of calls to be made the phone numbers to call, the acceptable abandonment rate, and other parameters that specify the campaign characteristics.

At prediction phase 220, a predictive model (any one of various known predictive algorithms can be utilized) is applied to each call, or a subset of calls, in the campaign to assign an individual probability of pick up for each of the calls analyzed by the predictive model. The individual probabilities of pick up can be stored in a database in association with the corresponding calls (e.g., phone numbers). At call launch phase 230, the individual probabilities generated by the predictive model can be applied to launch calls in the campaign in multiple cycles.

In particular, at call launch phase 230, a next number X of call records is read, at step 231, from the database storing the call campaign features. The number X of records can be adjusted in various ways and can be a predetermined fixed integer, such as 100. At step 232, the corresponding predicted pick up probabilities for each of the X calls is read from the database. At step 234, the probabilities are summed and a calculated suggested number of calls to be launched is generated. At 235, the maximum acceptable abandonment rate, the number of currently available agents and other parameters are retrieved, and an allowable number of calls is estimated based on these parameters. At 236 it is determined whether the allowable number of calls is greater than the suggested number of calls and, if so, the calculated suggested calls are launched. If not, the allowable number of calls can be launched step 230 can be repeated with a different value of X until the calculated suggested calls are less that the allowable number of calls.

Since the required latency for each cycle is very reduced, the application of the predictive model may have some tasks executed before each cycle. The predictive model can produce the features some time before in order to facilitate the procedure and to reduce required computing resources. For example, prediction phase 220 can be accomplished at any time if the data, parameters, and assumptions used by the predictive model are not out of date. To make the calculation of the number of calls even faster predicted probabilities can be generated each time the record list or other features of the campaign are updated in order to make predictions available for each cycle. Therefore, it is only necessary to extract the predicted values, and generate a cumulative sum thereof, once for each cycle. However, it may be desirable to have real-time access to the next records in order to produce a more accurate estimate of the number of launched calls.

Figure 3:
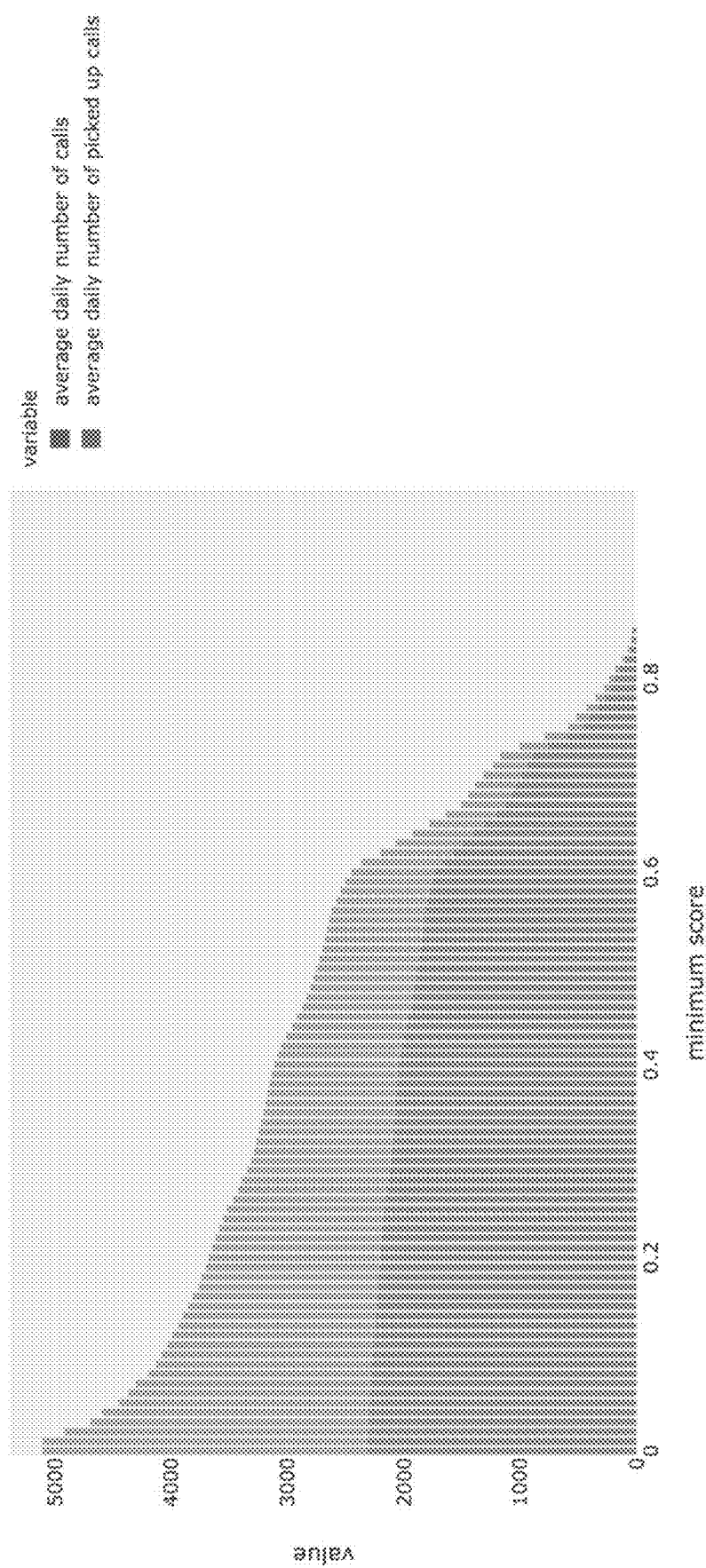
FIG. 3 is a graph showing the results of an analysis of the impact of the utilization of predicted values to select records in an outbound call campaign.

In another implementation, a predictive model can be applied to provide a more efficient selection of records and thus can avoid the unnecessary launch of many calls that will not be answered. Such a selection may improve the picked-up rate and agents' idle time by reducing the total number of calls with a minimum impact on the number of picked-up calls. Moreover, it allows a more efficient utilization of the resources by minimizing the degradation of caller IDs (e.g., less busy calls) and by making the cycles more productive. The probability of a call being picked-up is a logical criterion for the selection of records for a call campaign cycle. Therefore, those records with a very low probability could be excluded. FIG. 3 shows the results of an analysis of the impact of the utilization of predicted values to select records.

As shown in FIG. 3, the average daily number of calls has a sharp decline at the lowest minimum probability scores while the average daily number of picked-up calls has a minimum impact. This selection allows the system to discard a higher percentage of calls to be launched than the percentage of picked up calls that will be missed. For example, the utilization of 0.2 as a threshold allowed the system to increase the picked up rate from 45.48% to 60.2%.

Figure 4:
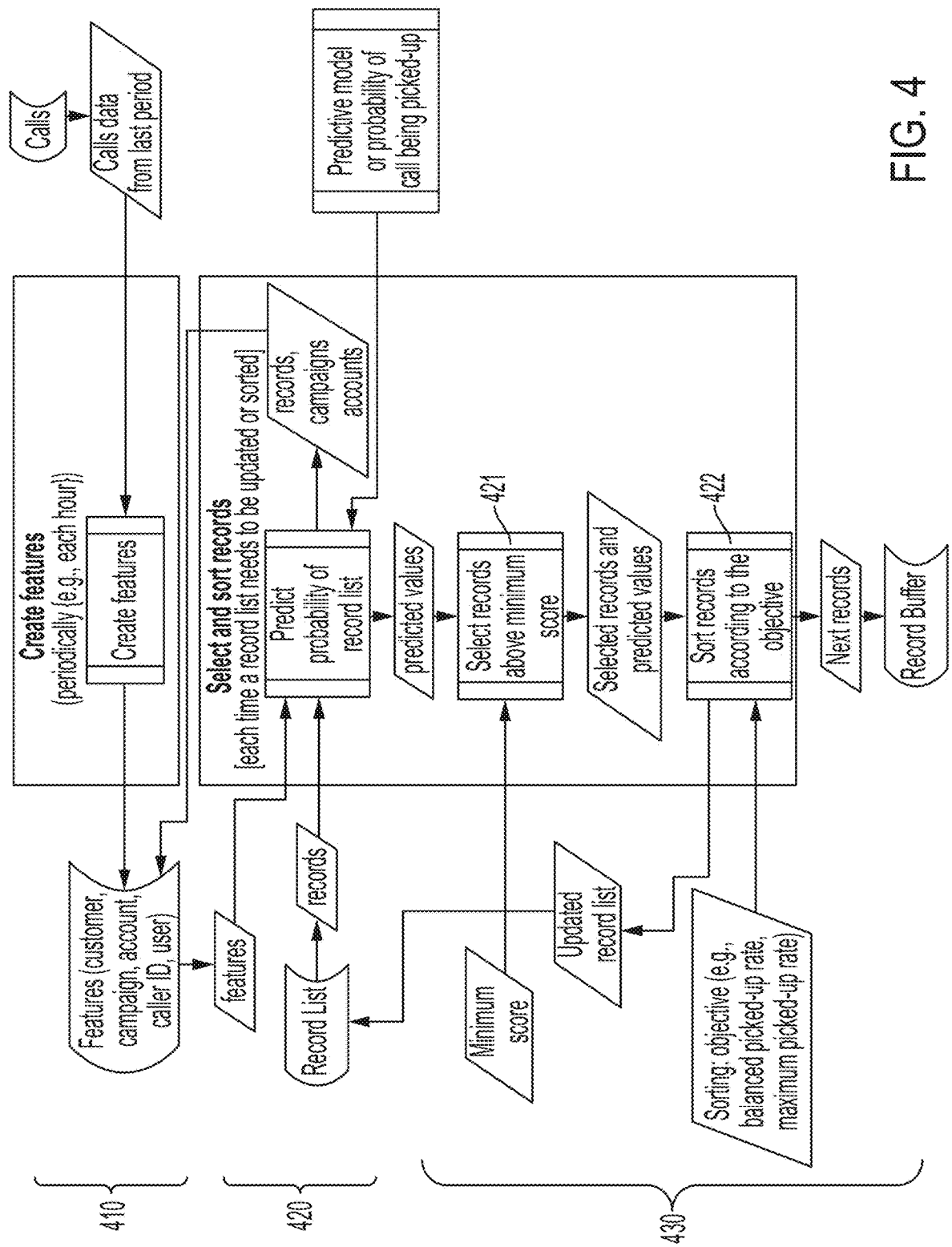
FIG. 4 is an architecture and flow diagram of utilization of predicted values to select records in an outbound call campaign.

Sorting records is also a task that could benefit from the utilization of the predictive model. The predicted probabilities of a call being picked-up could be a valuable basis to sort records. For example, if the objective is to schedule the best time to call, prediction can be made for different times and the best schedule can be selected according to these predictions. If the objective is to obtain a less volatile picked-up rate, records can be sorted in order to obtain a smoother distribution of the picked-up rate over time. If the goal is to first launch the calls with the highest probability of being picked-up and leave the ones with the lowest probability to the end, the records can be sorted in descending order according to the predicted probability. FIG. 4 shows the application of a predictive model to improve the selection and sorting of records for an outgoing call campaign.

As shown in FIG. 4, a call campaign can be created at creation phase 410 in a conventional manner. Creation phase 410 can be similar to, or the same as, creation phase 210 in FIG. 2. In predicting phase 420, a predictive model (any one of various known predictive algorithms can be utilized) is applied to each call, or a subset of calls, in the campaign to assign an individual probability of pick up for each of the calls analyzed by the predictive model. Predicting phase 420 can be similar to predicting phase 220 of FIG. 2. As noted above with respect to FIG. 2, the individual probabilities of pick up can be stored in a database in association with the corresponding calls (e.g., phone numbers).

The predictive model used for sorting can be similar to the model applied in the calculation of the number of launched calls as described above. The applied features can also be similar. However, this predictive model should be applied to the complete list of records when it is necessary to select and sort calls for a campaign. Also, this model may be applied for different times when it is necessary to schedule the best time to call. Call records are selected and sorted in sorting phase 430. Sorting phase 430 includes the primary steps of selecting records above a threshold/minimum score at 421 and sorting the records in accordance with objectives of the call campaign at 422. As noted above, the individualized call picked up rate is one metric that can benefit more from the application of learning models. The selection of records allows the system to discard a significant number of calls with minimum impact on picked-up calls. The agents' idle time can also benefit from the improvements made on the picked-up rate.

Agent reservations can be recalculated across cycles to guarantee a "blanket" effect for all dialed records across all campaigns. Campaigns with ongoing dials will have agents reserved for those possible calls. Conventionally, measures such as historical picked-up rate or maximum dialing ratio, which are not the most adequate measures are used for agent reservations. These measures are not ordinarily adjusted to the characteristics of current pending calls (e.g., attempt number, campaign, historical behavior of the customer) and to current ringing time. Thus, the utilization of a predictive model of the probability of a call being picked-up may allow a more effective allocation of agents by producing a more accurate estimate of the number of picked-up calls. Therefore, such an application can improve agents' idle time and abandonment rate by diminishing the difference between picked-up calls and allocated agents. The impact on these metrics are significant when there are more agents (increasing agents' idle time) or less agents (causing more abandonment then necessary).

Figure 5:
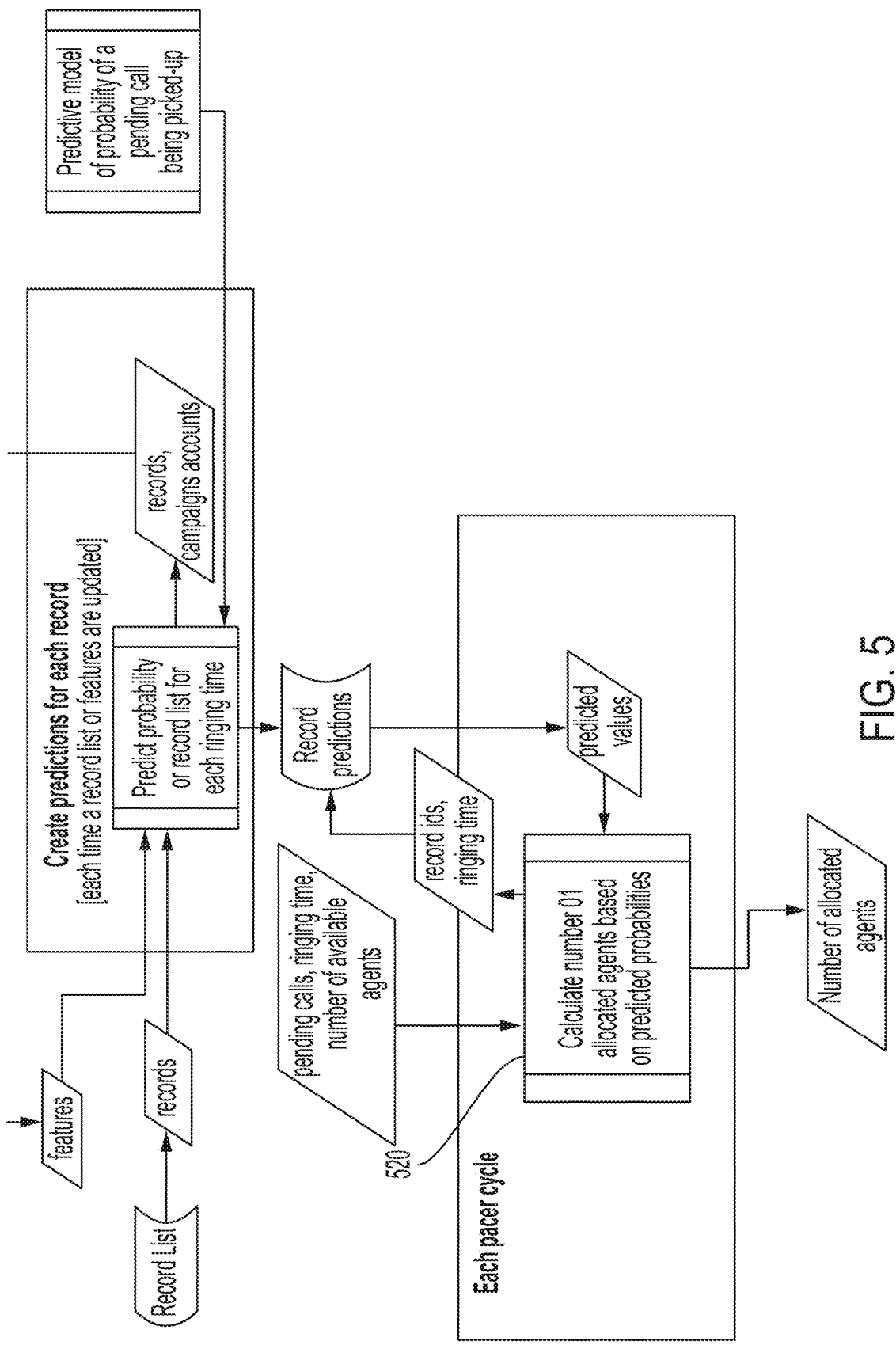
FIG. 5 is an architecture and flow diagram of utilization of predicted values to allocate agents in an outbound call campaign.

FIG. 5 illustrates the application of a predictive model to allocate agents for pending calls. The creation of the campaign and the utilization of the predictive model is similar that applied in the calculation of the number of calls. Both share the same features except for the ringing time that is provided in real time. Therefore, the creation of features is shared by both models. Also, the creation of the predictions is done at the same time (whenever a record list or features are updated) and these predictions are applied at each cycle. The prediction is accomplished for each recordID and possible ringing time. These two attributes are the input parameters required to extract predictive probabilities later in each cycle. However, it is necessary to train a different predictive model for this implementation because this application also uses ringing time as a parameter/feature. The implementations described above do not use ringing time because they are applied before each call is launched. Ringing time is used as a feature due to its predictive value and also because we do have this information available in each cycle for each pending call. At 520, the number of allocated agents is calculated based on the predicted probabilities for each ringing time. The utilization of the predictive model to allocate agents can improve intended abandonment and agents' idle time.

Figure 6:
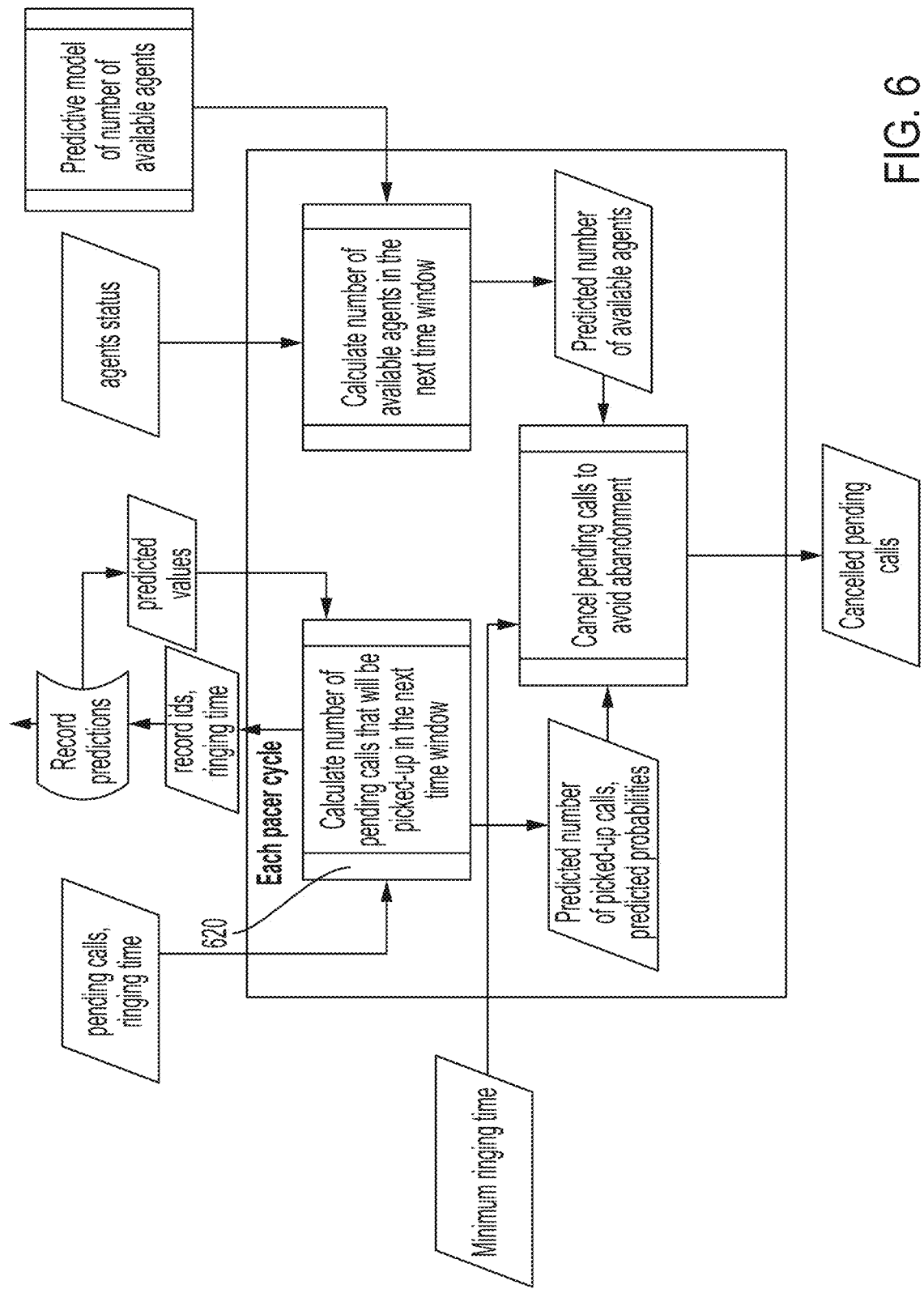
FIG. 6 is an architecture and flow diagram of utilization of predicted values to cancel pending calls in an outbound call campaign.

When the expected number of picked-up calls is much higher than the expected number of available agents, it is very likely that some of these calls will be abandoned. It would be useful to cancel some of these pending calls to avoid abandonment. The predictive models can also be applied to support the decision to cancel pending calls. Thus, it may be determined how many pending calls should be cancelled based on the predicted number of picked up calls and predicted number of available agents for the same time period. For example, if it is predicted that only one agent will be available, only the set of calls that will have one expected picked up calls can be kept and all the others can be cancelled. To be able to do it, we need a predictive model regarding a pending call being picked up (the same as the one applied to the allocation of agents) and another to predict the number of available agents in a specific time window. The later model could be trained by applying data about agents availability and activity. A predictive model of the number the available agents could be trained by applying data about agents availability and activity. The output should be the expected number of available agents in a specific time window. The predictive model applied in the allocation of agents could be used to estimate the number of picked-upcalls in the same time windows. Based on both predictions, the algorithm would decide which pending call should be canceled. FIG. 6 illustrate the utilization of a predictive model to cancel pending calls. At 620, the number of pending calls that will be picked up is calculated based on the predicted probabilities for each ringing time and other variables. At each cycle, the expected number of picked up calls among pending calls will be calculated based on the extracted predicted probabilities of being picked up and the extracted predicted number of available agents. Then, based on both predictions (expected number of picked up calls and expected number of available agents) it is decided the number of calls to be canceled. Therefore, it should only be kept the set of calls that will have a similar number of picked up calls to the expected number of available agents for the same time window. This improves intended abandonment rate with minimum impact on agents' idle time values.

A predictive model is also very useful to select/exclude calls in a campaign. The picked up rate increases as the applied minimum predicted value to select calls also increases. This selection allows the system to discard a higher percentage of calls to be launched than the percentage of picked up calls that will be missed. For example, the utilization of 0.2 as a threshold increased the picked up rate from 45.48% to 60.2% in experiments conducted by the applicant.

The predictive model is also valuable to produce a more accurate estimate of the picked up rate of the next calls in order to be applied in the calculation of the number of calls to be launched. This estimate adjusts to the variance of real picked up rate and it is substantially more accurate than the existing estimate (historical picked up rate of each campaign). Applicants' experiments resulted in a large improvement in the mean absolute error (from 0.165 to 0.088) and in the root mean squared error (from 0.206 to 0.116).

The utilization of the predicted picked-up rate improves both the average number of picked-up calls per cycle (related with agents' idle time) and the abandonment rate when compared with historical picked up rate and maximum dialing ratio (1, 2 and 3). The only exception is "power dialing", i.e. dialing a phone number right after a previous call is completed, for the abandonment rate but it has a high cost on the average number of picked up calls per cycle. For example, the median abandonment rate obtained by the historical picked-up rate, maximum dialing ratio 3 and maximum dialing ratio 2 were respectively 2.44, 4.31 and 2.26 times higher than the obtained by the predicted picked-up rate. Despite this large advantage on the abandonment rate, the median average number of picked-up calls per cycle obtained by the predicted picked-up rate was also higher than the median of the historical picked-up rate (+4.3%), maximum dialing ratio 2 (+12.1%) and power dialing (+77%) and very similar to maximum dialing ratio 3 (−1.2%).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A computer implemented method for generating outbound calls in a call center in which a plurality of agents are to communicate respectively with outside parties through the outbound calls, the method comprising:
   determining a number of agents available for outbound calls;
   determining phone numbers respectively corresponding to the outside parties;
   creating an ordered list of calls corresponding to the phone numbers;
   periodically generating new call attempts by automatically dialing the phone numbers at a dynamic rate, wherein a number of new call attempts is based on a predictive algorithm, wherein the predictive algorithm includes:
   (a) selecting a set of N number of calls that are next on the ordered list
   (b) determinizing corresponding probabilities of pick up for each call in the set of calls;
   (c) summing the corresponding probabilities of pick up to determine a pick up rate for the set of calls; and
   (d) launching a number of calls in the set of calls that correspond to the number of available agents; and
   repeating (a), (b), (c) and (d) until a desired number of calls have been launched.

2. The method of claim 1 further comprising, prior to step (d) determining if the picked up rate is too high and if the picked up rate for the set of calls is too high for the number of available agents, returning to step (a) and reducing N.

3. The method of claim 2, wherein the picked up rate is determined to be too high if it results in an abandonment rate that is higher than a predetermined threshold.

4. The method of claim 1, wherein the predictive model is trained to provide a more efficient selection of records to thereby reduce the number of calls that will not be answered.

5. The method of claim 1, wherein the predictive model is trained to sort records to thereby increase efficiency of the call campaign.

6. The method of claim 1, wherein the predictive model is trained to allocate agents for pending calls.

7. The method of claim 1, wherein the predictive model is trained to cancel pending calls that are not likely to served by an agent.

8. The method of claim 1, wherein the predicative model is trained with a data set derived from call disposition records from at least one previous call campaign.

9. The method of claim 8, wherein a number of new call attempts is based on a predictive algorithm which predicts at least one of a probability of an individual call being picked-up, a probability of an individual call being busy, or a probability of an individual call being abandoned.

10. The method of claim 1, wherein creating an ordered list of calls corresponding to the phone numbers includes determining corresponding probabilities of pick up for each call in the set of calls and sorting the records based on the corresponding probabilities.

11. The method of claim 1, wherein creating an ordered list of calls corresponding to the phone numbers includes determining corresponding probabilities of pick up for each call in the set of calls and selecting the records based on the corresponding probabilities.

12. A computer system for generating outbound calls in a call center in which a plurality of agents are to communicate respectively with outside parties through the outbound calls, the method comprising:

at least one computer processor; and at least one memory having instructions stored thereon which, when executed by the at least one computer processor, cause the at least one computer processor to carry out a method including:

determining a number of agents available for outbound calls;

determining phone numbers respectively corresponding to the outside parties;

creating an ordered list of calls corresponding to the phone numbers;

periodically generating new call attempts by automatically dialing the phone numbers at a dynamic rate, wherein a number of new call attempts is based on a predictive algorithm, wherein the predictive algorithm includes:

(a) selecting a set of N number of calls that are next on the ordered list (b) determinizing corresponding probabilities of pick up for each call in the set of calls;

(c) summing the corresponding probabilities of pick up to determine a pick up rate for the set of calls; and (d) launching a number of calls in the set of calls that correspond to the number of available agents; and repeating (a), (b), (c) and (d) until a desired number of calls have been launched.

13. The system of claim 12 further comprising, prior to step (d) determining if the picked up rate is too high and if the picked up rate for the set of calls is too high for the number of available agents, returning to step (a) and reducing N.

14. The system of claim 13, wherein the picked up rate is determined to be too high if it results in an abandonment rate that is higher than a predetermined threshold.

15. The system of claim 12, wherein the predictive model is trained to provide a more efficient selection of records to thereby reduce the number of calls that will not be answered.

16. The system of claim 12, wherein the predictive model is trained to sort records to thereby increase efficiency of the call campaign.

17. The system of claim 12, wherein the predictive model is trained to allocate agents for pending calls.

18. The system of claim 12, wherein the predictive model is trained to cancel pending calls that are not likely to served by an agent.

19. The system of claim 12, wherein the predicative model is trained with a data set derived from call disposition records from at least one previous call campaign.

20. The system of claim 19, wherein a number of new call attempts is based on a predictive algorithm which predicts at least one of a probability of an individual call being picked-up, a probability of an individual call being busy, or a probability of an individual call being abandoned.

21. The method of claim 12, wherein creating an ordered list of calls corresponding to the phone numbers includes determining corresponding probabilities of pick up for each call in the set of calls and sorting the records based on the corresponding probabilities.

22. The method of claim 12, wherein creating an ordered list of calls corresponding to the phone numbers includes determining corresponding probabilities of pick up for each call in the set of calls and selecting the records based on the corresponding probabilities.

* * * * *